United States Patent [19]

Borgren

[11] Patent Number: 5,185,085
[45] Date of Patent: Feb. 9, 1993

[54] WATER CRAFT AND METHOD FOR TREATING A BODY OF WATER

[76] Inventor: Peter M. Borgren, 825 Partridge St., #106, Duluth, Minn. 55811

[21] Appl. No.: 713,880

[22] Filed: Jun. 12, 1991

[51] Int. Cl.⁵ .............................................. C02F 7/00
[52] U.S. Cl. ..................... 210/747; 210/752; 210/758; 210/205; 210/242.2; 261/120
[58] Field of Search ............... 210/747, 749, 752, 758, 210/765, 170, 242.1, 242.2, 242.3, 194, 198.1, 205, 925; 261/120

[56] References Cited

U.S. PATENT DOCUMENTS

| | | | |
|---|---|---|---|
| 1,375,232 | 4/1921 | Rush | 405/31 |
| 2,641,108 | 6/1953 | Montgomery et al. | 61/20 |
| 3,184,923 | 5/1965 | Galvaing | 61/1 |
| 3,584,462 | 6/1971 | Gadd | 210/170 |
| 3,590,584 | 7/1971 | Fitzgerald et al. | 210/242 |
| 3,595,392 | 7/1971 | Markel | 210/242.1 |
| 3,666,099 | 5/1972 | Galicia | 210/242 |
| 3,688,506 | 9/1972 | Marcocchio | 210/242 |
| 3,755,142 | 8/1973 | Whipple | 210/758 |
| 3,768,656 | 10/1973 | Nugent | 210/242 |
| 3,823,828 | 7/1974 | Derzhavets et al. | 210/242 |
| 3,837,627 | 9/1974 | Sence et al. | 210/242.2 |
| 3,890,234 | 6/1975 | Galicia | 210/194 |
| 3,966,614 | 6/1976 | Ayers | 210/242.3 |
| 4,034,231 | 7/1977 | Conn et al. | 290/53 |
| 4,058,461 | 11/1977 | Gaw | 210/242.3 |
| 4,105,362 | 8/1978 | Sforza | 415/2 |
| 4,111,594 | 9/1978 | Sforza | 415/2 |
| 4,120,793 | 10/1978 | Strain | 210/175 |
| 4,139,470 | 2/1979 | Stagemeyer et al. | 210/170 |
| 4,172,689 | 10/1979 | Thorsheim | 415/7 |
| 4,182,679 | 1/1980 | Van Hekle | 210/242.3 |
| 4,191,650 | 3/1980 | Muneta | 210/242.3 |
| 4,208,287 | 6/1980 | Brieck | 210/242.3 |
| 4,265,757 | 5/1981 | Ivanoff | 210/242.3 |
| 4,708,488 | 11/1987 | Ericsson | 366/139 |
| 4,818,416 | 4/1989 | Eberhardt | 210/749 |

FOREIGN PATENT DOCUMENTS

| | | | |
|---|---|---|---|
| 0238773 | 9/1987 | European Pat. Off. | 261/120 |
| 2613940 | 10/1976 | Fed. Rep. of Germany | |
| 1015119 | 12/1965 | United Kingdom | |

OTHER PUBLICATIONS

"The Ifs, Ands and Buts of Lake Aeration," by Edward B. Swain, Minnesota Pollution Control Agency, St. Paul, Minn., p. 38-Minnesota Lake Management Conference, Oct. 1989.

Primary Examiner—Peter Hruskoci
Attorney, Agent, or Firm—Palmatier & Sjoquist

[57] ABSTRACT

A boat and method for treating a body of water which includes continuously scooping surface water as the boat traverses the lake. The method may include the step of adding a neutralizing agent such as lime to a body of water. To avoid forming "hot spots" in the body of water, water is continuously scooped from the surface and treated while in a barge which trails the boat. Neutralized water, instead of lime, is then returned to the lake at a predetermined depth. To treat as much water as quickly as possible, the scoops are funnel-like with parabolic portions, and conduits conveying water from the scoops have high velocity pumps to increase the velocity of the water relative to the speed of the boat. The barge includes a number of compartments for containing a variety of chemicals such as lime. The scooped water may be directed to one or more of the compartments. In an additional or alternative treatment, the water being scooped from the surface may be aerated and returned to a lower, oxygen-depleted level of the lake.

3 Claims, 4 Drawing Sheets

WATER CRAFT AND METHOD FOR TREATING A BODY OF WATER

The present invention relates to water craft and, more particularly, to a water craft and method for treating a body of water such as by adding a neutralizing agent to a fresh water lake polluted by acid rain.

BACKGROUND OF THE INVENTION

A body of water, especially a freshwater lake, may have a number of problems. First, and perhaps most importantly, may be high acidity caused by acid rain. Unfortunately, treatment of lakes polluted by acid rain has been haphazard. A typical treatment for an acid body of water such as a lake includes "bombing" the water with tons of limestone and then allowing the limestone to settle. Such a treatment creates "hot spots" or warm regions in the lake that may reduce the amount of oxygen in the lake and otherwise adversely affect the ecosystem of the lake.

Second, oil spills have become all too common. Although oil spills caused by ocean tankers running aground may gather headlines, leakage from pipelines or landfills and attendant run off into freshwater lakes or or rivers is perhaps more common.

Third, biological "pollution" may be caused by over enthusiastic attempts to aerate for fishery purposes. A freshwater lake, especially at the end of summer and throughout the fall and winter months, may have an upper oxygen-rich relatively warm layer and a lower oxygen-depleted relatively cool layer. Vigorous aeration of the lower layer is often counterproductive as it may stir nutrients such as nitrogen and phosphorus into the upper layer to produce a conducive environment for algae and other plant growth, which in turn may create plant canopies and block sunlight into the lake.

SUMMARY OF THE INVENTION

A feature of the present invention is the provision in a method for treating a body of water, of traversing the surface of the body of water with a boat and continuously scooping water from the surface and then conveying the water scooped from the surface back to the water at a substantial depth below the surface of the body of water.

Another feature is the provision in such a treatment method, of aerating the water scooped from the surface.

Another feature is the provision in such a treatment method, of adding a neutralizing agent to the water being scooped from the surface to raise the pH of the water.

Another feature is the provision in such a treatment method of a scoop for scooping the water from the surface having a funnel-like portion to increase the velocity of the water being scooped from the surface relative to the velocity of the boat.

Another feature is the provision in such a treatment method, of pumping the water after it has been scooped to further increase its velocity relative the boat and to provide for greater efficiencies.

Another feature is the provision in a boat utilized for such a method, of the boat being supported relative to the water by a pair of pontoons and the scoop being disposed between the pontoons.

Another feature is the provision in a boat utilized for such method, of a barge trailing the pontoon-supported boat and having a number of compartments for containing lime or a variety of chemicals.

Another feature is the provision in a boat utilized for such a method, of an extendible dispensing line on the barge for conveying treated surface water back to the body of water at selected depths.

An advantage of the present invention is that the acidity of a body of water may be reduced without creating "hot spots" or abnormally warm regions of a body of water.

Another advantage is that the lower oxygen-depleted layer of a body of water may be aerated by the addition of the oxygen-rich surface layer.

Another advantage is that oil from an oil spill may be skimmed and recovered from the surface layer of the body of water.

Another advantage is that the vehicles utilized for such treatment methods are relatively small and light weight for delivery to problem areas by truck, ship or aircraft.

Another advantage is that contaminants other than oil such as DDT may be skimmed from the surface of the water.

Other advantages are that the pH of a body of water may be accurately, efficiently, and economically adjusted.

BRIEF DESCRIPTION OF THE DRAWINGS

FIG. 6 is a perspective view of an alternate embodiment of the present invention utilizing jet pumps for conveying the scooped water from the boat to the barge.

DETAILED DESCRIPTION OF THE PREFERRED EMBODIMENTS

Figure 1:
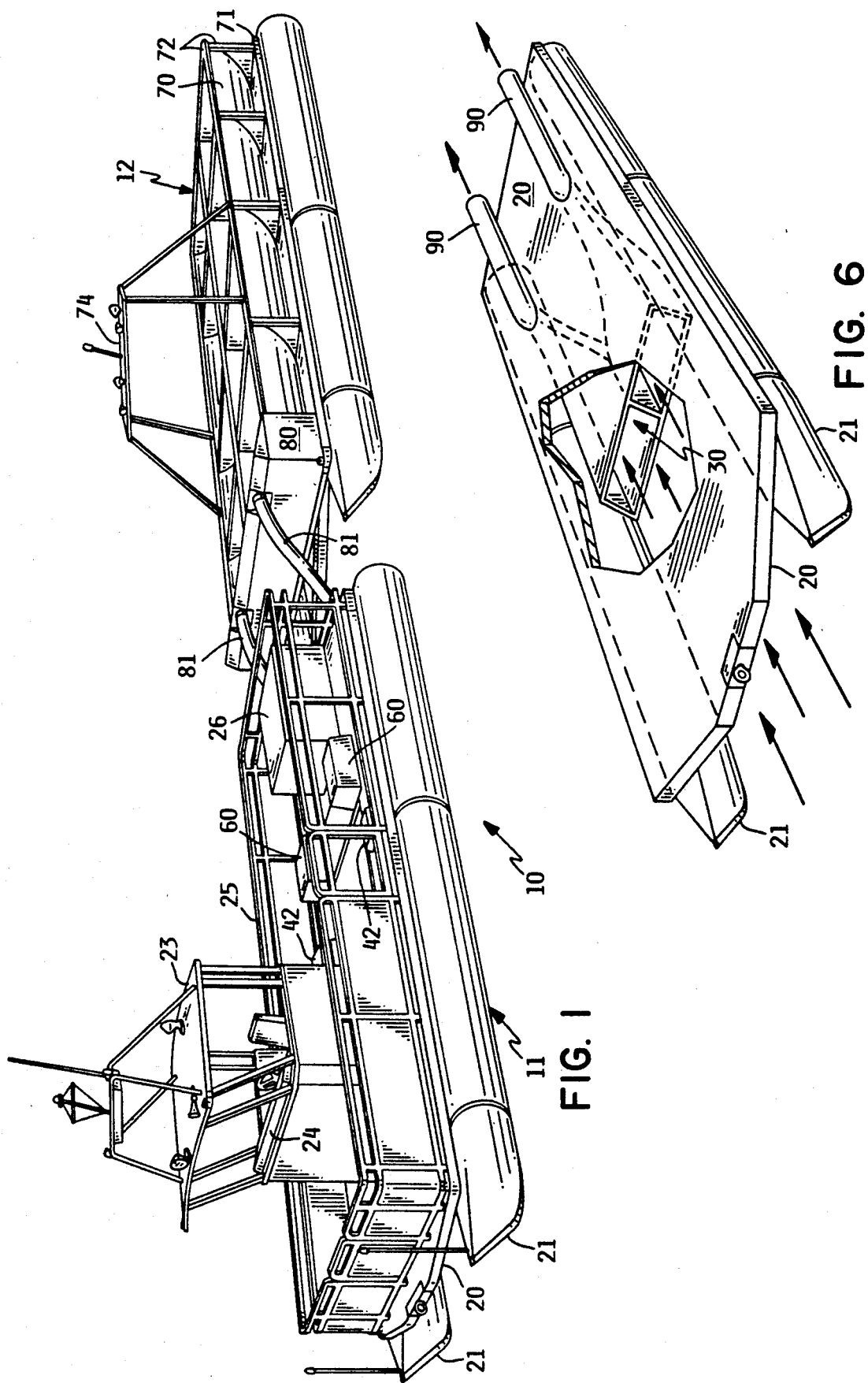
FIG. 1 is a perspective view of the present pontoon boat and its trailing barge.

As shown in FIG. 1, the present water craft for treating a body of water is indicated in general by the reference numeral 10. It includes as its principal components a pontoon boat 11 and a trailing barge 12.

Figure 2:
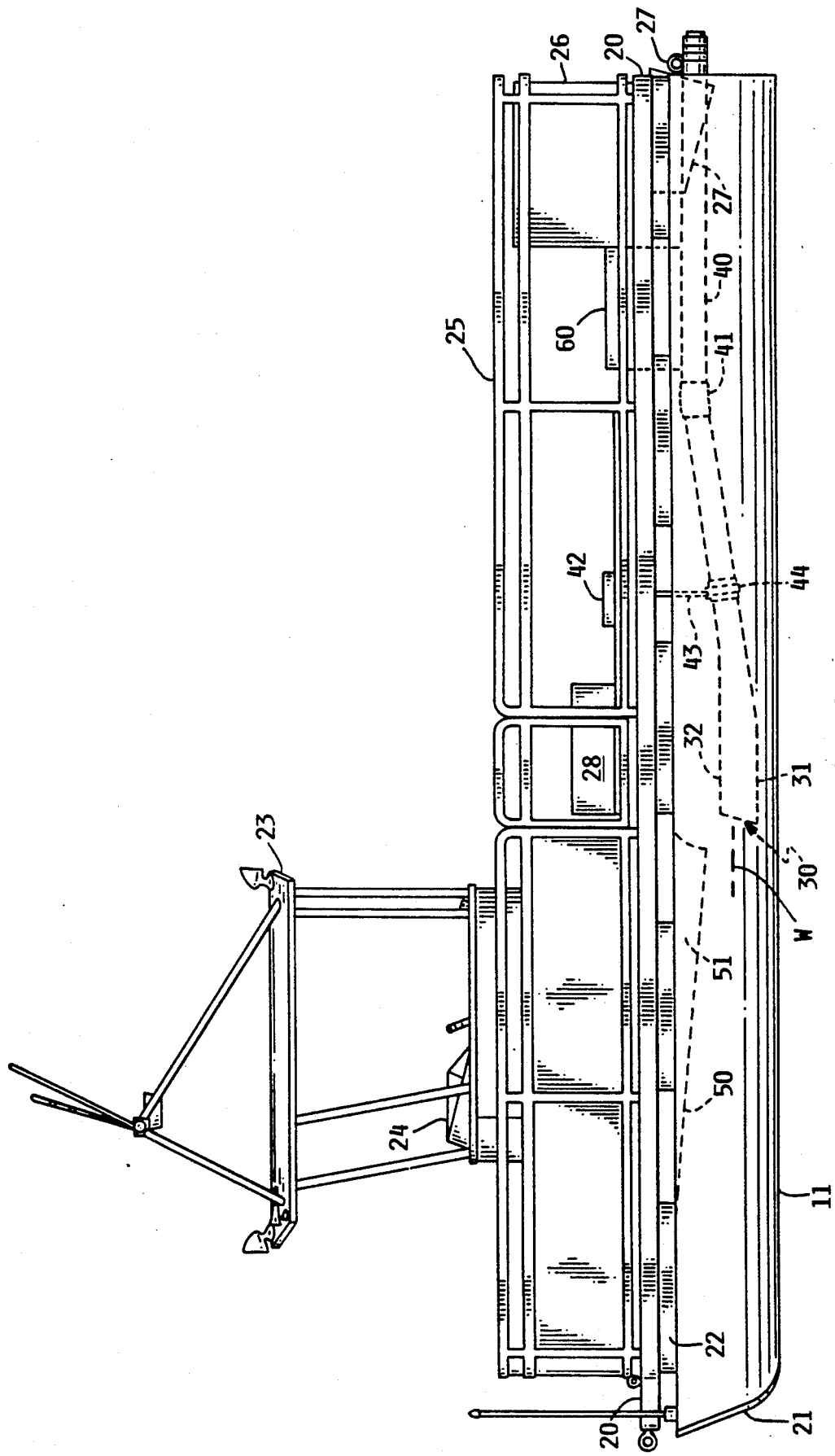
FIG. 2 is a side elevation, partially phantom view of the boat of FIG. 1.

As shown in FIGS. 1 and 2, the pontoon boat 11 includes a platform or floor 20 having a pair of pontoons 21 extending from its underside and affixed thereto via a number of supports 22. Extending from the top side of the floor 20 is a control bridge 23 with an instrument console or control panel 24. The platform 20 includes guard rails 25 extending substantially about its perimeter. At its rear end or stern, the platform 20 includes a drive or propelling means 26 and tow assembly 27. A power generator 28 is affixed generally centrally on the platform 20.

As shown in FIGS. 1-4, a pair of scoops 30 for scooping surface water are positioned between the pontoons 21. Each of the scoops 30 includes a lower panel 31, an upper panel 32, an outer panel 33, an inner panel 34, and an oblique panel 35 which extends integrally, rearwardly and outwardly from the inner panel 34. The scoops 30 form funnel-like interiors to funnel and convey the scooped water into respective primary conduits 40 affixed to and below the platform 20. Each of the scoops 30 is connected to a somewhat flexible, accordian-like conduit section 41 which is connected between each of the conduits 40 and its respective scoop 30. The flexible conduit section permits a raising and lower of the scoops 30 via hydraulic scoop lifts 42. Each of the lifts 42 includes a hydraulic cylinder with a respective rigid piston rod 43 extending through the platform and secured to a respective belt 44 strapped about its respective scoop 30. The hydraulic scoop lifts 42 may draw the scoops 30 completely out of the water or position the scoops 30 beneath the surface of the water at a predefined depth. The preferred depth for the lower panels 31 is approximately five inches for the typical waterline, which is defined by the letter W in FIG. 2. The depth of the scoops 30 may be inspected through openings in the platform 20 which are normally closed by hinged inspection panels 45.

Figure 4:
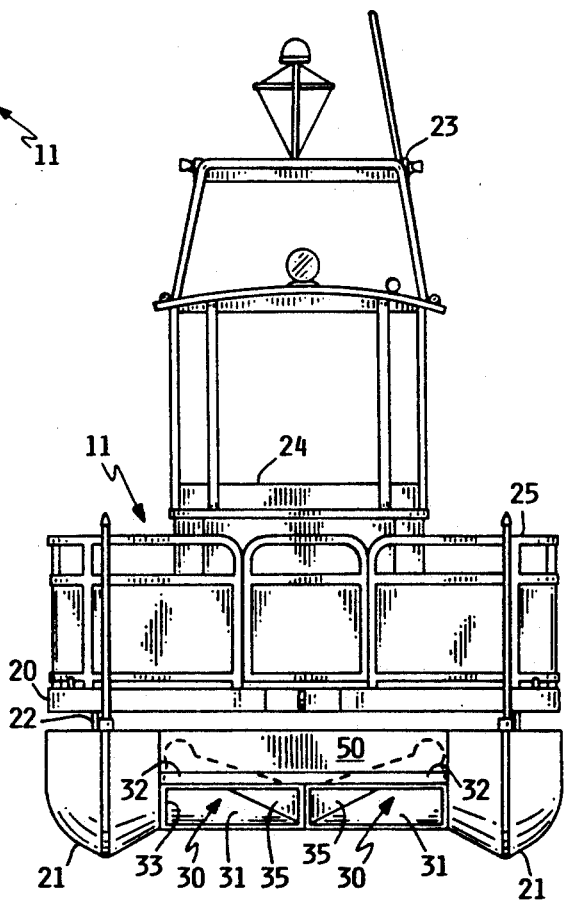
FIG. 4 is a front end elevation, partially phantom view of the boat of FIG. 1.

As shown in FIGS. 2 and 4, a water deflection panel or water deflector 50 is secured to the underside of the platform 20 for deflecting water and waves into the scoop 20. The water deflector 50 is affixed to the platform 20 via side triangular-like supports 51.

Figure 3:
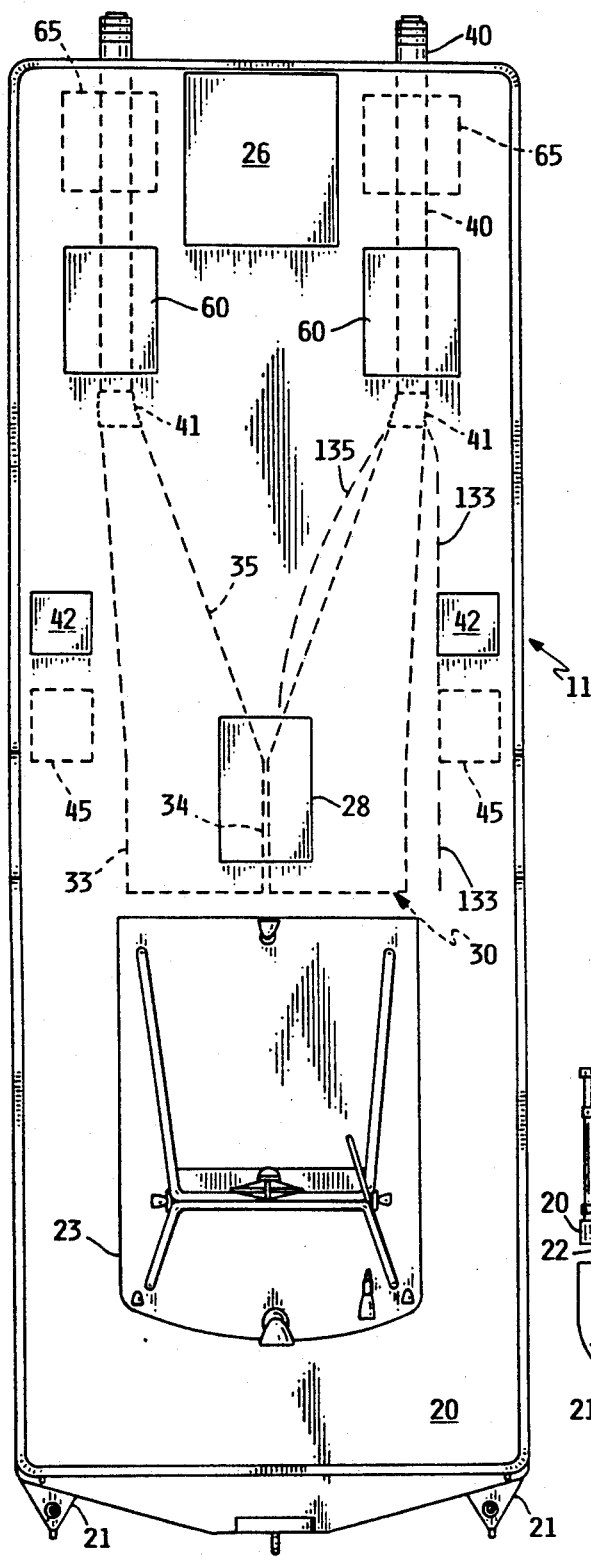
FIG. 3 is a top plan, partially phantom view of the boat of FIG. 1.

As shown in FIGS. 1-3, a pair of pumps 60 on the platform 20 pump water scooped by the scoops 30 into the trailing barge 12. Although the velocity of the boat 11 is typically sufficient to force the scooped water through the conduits 40 and into the barge 12, the pumps 60 allow the boat 11 and barge 12 to process a greater amount of water.

As shown in FIG. 3, a pair of aerators 65 for aerating the scoop's surface water are positionable on the platform 20.

Figure 5:
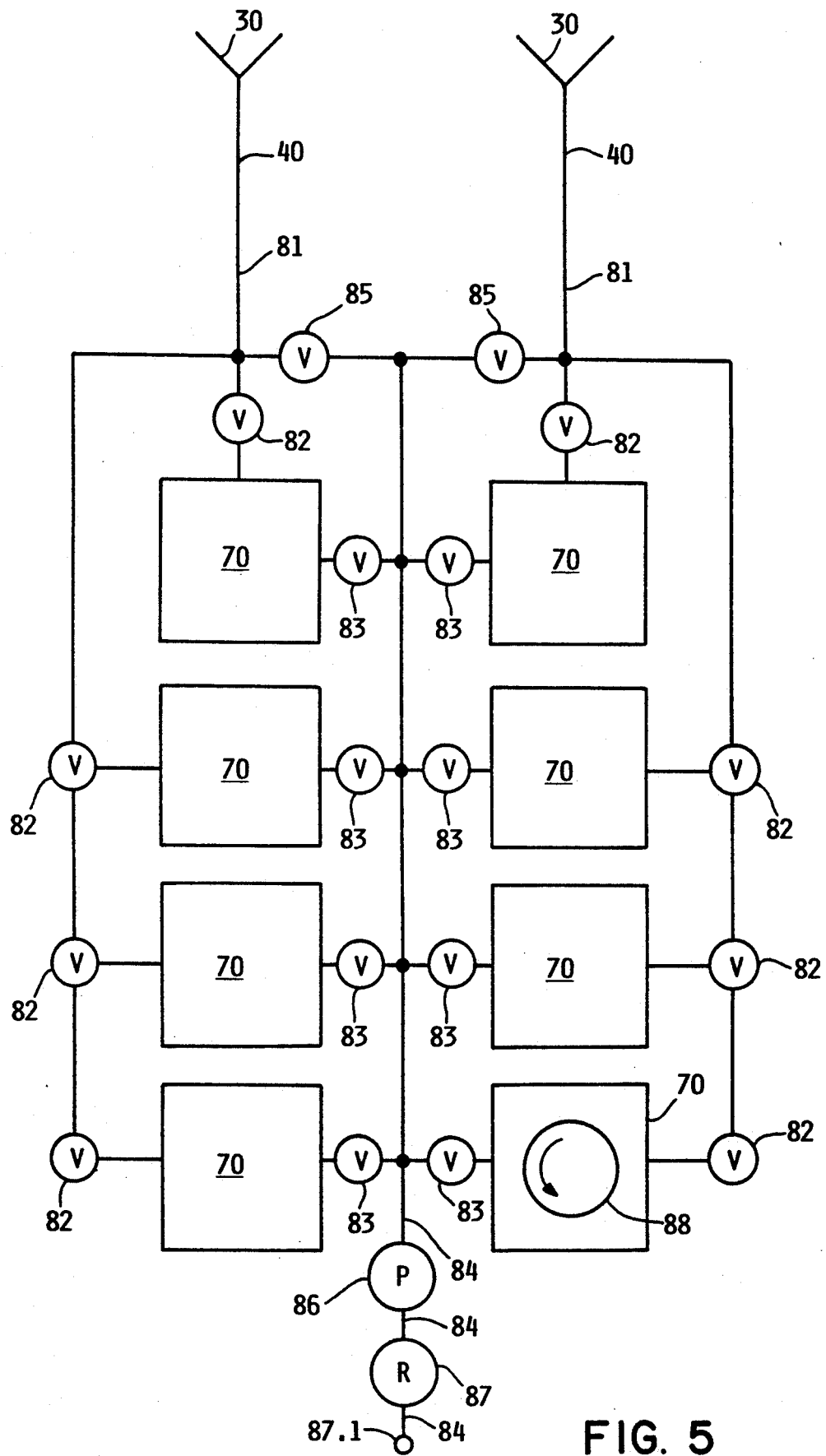
FIG. 5 is a schematic illustration of the scoops, primary conduits, and secondary conduits of the boat and barge of FIG. 1.

As shown in FIGS. 1 and 5, the trailing barge 12 includes eight open compartments 70 for containing lime or other chemicals for mixing with the water scooped by the scoops 30. The compartments are affixed to a platform 71 and to each other via a frame assembly 72. Tow assembly 27 of the boat 11 is connectable to a tow assembly affixed to the platform 71 of the barge 12. A pair of pontoons 73 are affixed to the underside of the platform 71. A bridge 74 extends over the compartment 70 for the requisite nautical lights, signals and other apparatus.

As shown in FIGS. 1 and 5, a manifold 80 on the front end of the platform 71 is coupled to flexible conduits 81 which are in turn coupled at their front ends to the conduits 40 of the boat 11. Surface water scooped by the scoops 30 and conveyed by the conduits 40 and into the conduits 81 flows into the manifold 80 where it is directed to any or some or all of the compartments 70 via valves which are electrically connected to and controlled at the instrument console 24. Each of the compartments has an inlet valve 82 and an outlet valve 83. Outlet valves 83 allow fluid flow into an outlet line 84 for conveying the scooped water back to the body of water. Valves 85 are opened and valves 82 are closed when it is desired to bypass the compartment 70 and return scooped, perhaps aerated, water directly back to the body of water. Outlet line 84 includes a pump 86 to pump water through the line 84 to more than 15-20 feet below the surface of the water. The line 84 is wound on a reel 87 downstream from the pump 86. The reel 87 releases the line 84 to the prescribed depth. The distal end 87.1 of the line 84 may be weighted to draw the line 84 to the prescribed depth. After the treatment operation, the reel 87 retracts the line 84.

In operation, to scoop up oxygen-rich surface water and convey it more than 15-20 feet below the surface of a body of water, valves 82 are closed and valves 85 are open. The scoops 30 are positioned typically such that lower scoop panels 31 are disposed five inches below the surface of the body of water. Subsequently, boat 11 is operated such that the water is scooped into the scoops 30 and is forced into the conduits 40 where it may be pumped by the pump 60 to and into the conduits 81 and manifold 80. While in the conduits 40, the scooped water may be aerated by the aerators 65. Subsequent to the manifold 80, the scooped water flows into outlet line 84 where it is pumped 15-20 feet below the surface of the water by pump 86 to an oxygen-depleted lower aqueous layer of the lake.

In such a method, the boat 11 and barge 12 may traverse the surface of a body of water such as a fresh water lake a number of times. The sediment at the bottom of the lake remains undisturbed as aeration takes place on the boat 11, not at the lake bottom.

If it is desired to deacidify a body of water such as a freshwater lake, lime or calcium oxide, typically in pellet form, may be added to one or more of the compartments 70. Surface water may then be scooped, pumped and aerated if desired, as described above. The scooped water may then be directed to one or more of the compartments 70 by the manifold 80. From each of the inlet valves 82, the scooped surface water is poured onto the lime and allowed to flow down through the pellets such that the lime dissolves in and reacts with the acidic scooped water. The scooped treated water may then be returned to the lake at or below its surface.

A number of factors may control the amount of lime added to the scooped water. These factors include (1) the volume of water scooped, which may be controlled by the velocity of the boat, the depth at which the scoops 30 are disposed, and the amount of water drawn by the pump 60; (2) the number of compartments 70 being utilized and the amount of lime therein; (3) the concentration of the lime in the compartments; and (4) the amount of water and lime allowed into the outlet line 84 by the outlet valves 83.

Such factors may be controlled such that an excess of lime may be added to water flowing out through the outlet line 84. This excess line may then react with acidic water at the surface of the lake, or below the surface, in an oxygen-depleted lower layer.

One reason for the addition of lime continuously in a stream-like fashion is to avoid the creation of "hot spots" in the lake. One reason for the addition of lime below the surface of a lake is to introduce lime into an oxygen-depleted lower aqueous layer of the lake, which upon being neutralized may have a greater affinity for oxygen.

If it is desired to skim oil or other pollution from the surface of a lake, some or each of the compartments 70 may include a centrifuge 88 for separation of the scooped water and oil. One or more of the compartments 70 may also include activated charcoal for the removal of toxins such as DDT.

In an alternate embodiment as shown in FIG. 6, the conduits 40 may be replaced by high velocity jet pumps 90 extending through the platform 20. The jet pumps 90 propel the scooped water aft over the fantail of the boat 11 and into the trailing barge 12. Accordingly, the jet pumps 90 are the sole sources of water transfer aft into the the barge 12. Such an embodiment may be utilized in small ponds where the forward speed of the boat 11 and the attendant thrust which is required are limited. As it is difficult to direct the water propelled over the aft into predefined compartments, all the compartment typically contain the same chemical when the jet pumps 90 are utilized.

It should be noted that the outer panel 33 and oblique panel 35 of the scoops 30 may be parabolic or curved as shown by respective reference numerals 133, 135 in FIG. 3. It is believed that such curvature increases or enhances the velocity of the water being scooped relative to the velocity of the boat. Such curvature may also extend to the lower panel 31, the upper panel 32, and the inner panel 34.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method for treating a body of water with a boat, comprising:
   (a) traversing the surface of the body of water with the boat, the boat comprising at least one scoop positioned at least partially immediately below the surface to scoop water from the surface, the scoop having a lower panel, an upper panel, an outer panel, an inner panel, and an oblique panel extending integrally, rearwardly and outwardly from the inner panel to funnel and convey the scooped water, the scope including an inner surface portion against which the water being scooped flows, the inner surface portion of the scoop being curved to increase the velocity of the water being scooped from the surface relative to the velocity of the boat, the boat having hydraulic means for raising and lowering the scoop relative to the surface of the water such that the scoop may be drawn completely to of the water,
   (b) continuously scooping oxygen rich surface water from the surface of said body of water with the scoop as the boat traverses the surface,
   (c) pumping the water rearwardly away from the scoop after the water has been scooped to increase the velocity of such water, the scooped water being continually conveyed rearwardly from the scope to where it is pumped, and
   (d) conveying the water which has been scooped from the surface back to the body of water to a depth more than 15 feet below the surface of the body of water such that oxygen rich water scooped from the surface is conveyed to oxygen depleted depths in the body of water to treat the depths by adding oxygen thereto.

2. The invention of claim 1, wherein eh step of pumping the water scooped from the surface further comprises the steps of adding a neutralizing agent to the water to raise the pH of the water scooped from the surface.

3. A method for adding a neutralizing agent to a body of water with a boat, comprising:
   (a) traversing the surface of the body of water with the boat, the boat comprising at least one scoop positioned at least partially immediately below the surface to scoop water from the surface, the scoop having a lower panel, an upper penal, an outer panel, an inner panel, and an oblique panel extending integrally, rearwardly and outwardly from the inner panel to funnel and convey the scooped water, the scoop including an inner surface portion against which the water being scooped flows, the inner surface portion of the scoop being curved to increase the velocity of the water being scooped from the surface relative to the velocity of the boat, the boat having hydraulic means for raising and lowering the scoop relative to the surface of the water such that the scoop may be drawn completely out of the water,
   (b) continuously scooping oxygen rich surface water from the surface of said body of water with the scoop as the boat traverses the surface, and pumping the water rearwardly away from the scoop, the scooped water being continually conveyed rearwardly from the scoop to where it is pumped,
   (c) directing the water scooped from the surface to a reaction zone containing a neutralizing agent, the step of directing the water to the reaction zone comprising the step of pumping the water to the reaction zone to increase the velocity of the water, and the reaction zone comprising a set of compartments, and the step of directing the water to the reaction zone comprising the step of selecting the compartment to which the water is directed such that the water being directed is mixable with one or more of a variety of neutralizing agents,
   (d) mixing the water scooped from the surface with the neutralizing agent in the reaction zone to raise the pH of the water scooped from the surface, and
   (e) conveying the water mixed with the neutralizing agent back to the body of water in a substantially continuous steam to a depth more than 15 feet below the surface of the body of water such that oxygen rich water scooped from the surface is conveyed to oxygen depleted depths in the body of the water to treat the depths by adding oxygen thereto.

* * * * *

UNITED STATES PATENT AND TRADEMARK OFFICE
CERTIFICATE OF CORRECTION

PATENT NO. : 5,185,085

DATED : February 9, 1993

INVENTOR(S) : Peter M. Borgren

It is certified that error appears in the above-identified patent and that said Letters Patent is hereby corrected as shown below:

In claim 1, column 5, line 33, "scope" should be -- scoop --; in claim 1, column 5, line 41, "to" should be -- out --.

In claim 2, column 6, line 3, "eh" should be -- the --.

In claim 3, column 6, line 14, "penal" should be -- panel --; in claim 3, column 6, line 49, "steam" should be -- stream --.

Signed and Sealed this

Sixteenth Day of November, 1993

*Attest:*

BRUCE LEHMAN

*Attesting Officer*     *Commissioner of Patents and Trademarks*